(12) United States Patent
Spencer et al.

(10) Patent No.: US 7,696,460 B1
(45) Date of Patent: Apr. 13, 2010

(54) FREQUENCY ADJUSTING ARRANGEMENT

(75) Inventors: George R. Spencer, Needham, MA (US); James Williamson, Franklin, MA (US); Paul G. Crete, Chelmsford, MA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 05/879,642

(22) Filed: Feb. 16, 1978

(51) Int. Cl.
*F41G 7/00* (2006.01)
*F42B 15/01* (2006.01)
*F42B 15/00* (2006.01)

(52) U.S. Cl. .................. 244/3.19; 244/3.1; 244/3.15

(58) Field of Classification Search .................. 244/3.1, 244/3.15, 3.19
See application file for complete search history.

(56) References Cited

U.S. PATENT DOCUMENTS

| | | | | |
|---|---|---|---|---|
| 3,938,148 | A | * | 2/1976 | Hobson .................. 343/7 A |
| 3,953,849 | A | * | 4/1976 | Couvillon .............. 343/7 A |
| 4,100,545 | A | * | 7/1978 | Tabourier .............. 343/7 A |

* cited by examiner

*Primary Examiner*—Michael Carone
(74) *Attorney, Agent, or Firm*—Daly, Crowley & Mofford, LLP

(57) ABSTRACT

A circuit for compensating for frequency modulation on a radar signal is disclosed. The disclosed circuit includes an adaptive narrow band filter in the feedback path of a phase-locked detector, such filter having a bandwidth which is narrower than the frequency range of the signal being compensated, and means for detecting the amplitude of such signal.

The invention herein described was made in the course of, or under a contract or subcontract thereunder, with the Department of Defense.

4 Claims, 2 Drawing Sheets

FREQUENCY ADJUSTING ARRANGEMENT

BACKGROUND OF THE INVENTION

This application pertains generally to signal processing circuitry in a radar receiver and particularly to an adaptive narrow band filter capable of locking on and tracking a signal having a frequency range wider than the bandwidth of such filter.

It is known in the art that a continuous wave radar may be made capable of ranging on targets by appropriate modification of the waveform of the signal transmitted by such a radar. One known way of accomplishing such an end is periodically to frequency modulate a continuous wave carrier signal with a sinusoidal waveform so that a comparison between the instantaneous frequency of the sinusoidal waveform and the frequency of echo signals may be made to indicate the approximate range of each detected target. A radar with such coding of the transmitted signal will be referred to hereinafter as an FM-CW radar.

In the semiactive missile guidance system shown in the copending patent application entitled "Adaptive Semiactive Missile Guidance System and Elements Therefor", Ser. No. 579,291, inventors Donald S. Banks, George R. Spencer and James Williamson, filed on May 20, 1975 and assigned to the same assignee as this invention, an FM-CW radar is used as a control radar to illuminate both a target and a guided missile in flight to allow the latter to process radar signals to derive guidance signals. In the processing of echo signals on the guided missile final demodulation is accomplished by applying the downconverted echo signal to a phase detector along with a reference signal from a voltage-controlled oscillator. The frequency of the voltage-controlled oscillator is controlled through a feedback circuit incorporating a filter (which has a relatively wide passband under some conditions and relatively narrow passband under other conditions) to null the output of the phase detector. When the filter has a relatively wide passband, i.e. wider than any frequency modulation present on the signal being demodulated, the frequency modulation on the down-converted echo signal is passed to the voltage-controlled oscillator with practically no change in amplitude or phase. The reference signal out of the voltage-controlled oscillator then is caused similarly to vary, ultimately then to null the output of the phase detector. A different situation obtains, however, when the filter has a relatively narrow passband, i.e. narrower than the frequency modulation on the signal to be demodulated. In that case the frequency modulation on the down-converted echo signal is blocked, more or less, or shifted in phase by the filter. Then, because the reference signal out of the voltage-controlled oscillator is not modulated with a replica frequency modulation on the downconverted echo signal, the output of the phase detector cannot be nulled. That is to say, the frequency modulation on the downconverted echo signal appears at the output of the phase detector as an error signal at the repetition frequency of the FM-CW radar.

An attempt was made in the referenced system to solve the problem being discussed. The approach taken was to detect the frequency modulation on the downconverted echo signal and then, after filtering, to apply the resultant (along with the signal out of the filter in the feedback circuit) to the voltage-controlled oscillator. While, in theory, the just-outlined approach should be satisfactory, it has not so proved to be. The difficulty experienced in practice derives from the fact that proper filtering of the detected frequency modulation is almost impossible to achieve under all conditions. That is, when the signal-to-noise ratio between the downconverted echo signal and noise accompanying such signal is low, there is no practical way of reducing the noisiness of the detected frequency modulation to an acceptable degree.

SUMMARY OF THE INVENTION

In view of the foregoing, it is a primary object of this invention to provide an improved circuit for eliminating the effect of frequency modulation of echo signals in an FM-CW radar.

Another object of this invention is to accomplish the foregoing when the signal-to-noise ratio between echo signals and noise in an FM-CW radar is low.

The foregoing and other objects of this invention are attained generally by detecting, in a detecting arrangement incorporating a phase-locked loop to provide adaptive narrow band filtering, the frequency modulation on the radar signal transmitted directed from an FM-CW radar on a mother aircraft to a guided missile in flight, then modifying the amplitude and phase of such detected frequency modulation to form a replica of the frequency modulation on the echo signal from a target (as such echo signal is received at the guided missile), and applying such replica to a voltage-controlled oscillator which furnishes a reference signal to a phase detector in a phase-locked loop for demodulating the downconverted echo signal, thereby to eliminate the effect of frequency modulation of such echo signal under almost all conditions.

BRIEF DESCRIPTION OF THE DRAWINGS

For a more complete understanding of this invention reference is now made to the following description of the accompanying drawings wherein:

FIG. 1A is a block diagram of the electronics in the guided missile of FIG. 1, the diagram being intended to show how the major elements of the electronics are arranged to eliminate the effects of frequency modulation of the radar signal from the FM-CW radar.

DESCRIPTION OF THE PREFERRED EMBODIMENT

Figure 1:
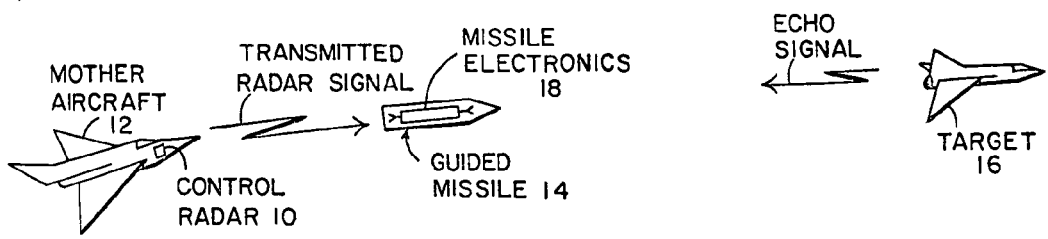
FIG. 1 is a generalized sketch showing a guided missile in flight toward a target, such missile and target being illuminated by an FM-CW radar.
Figure 1:
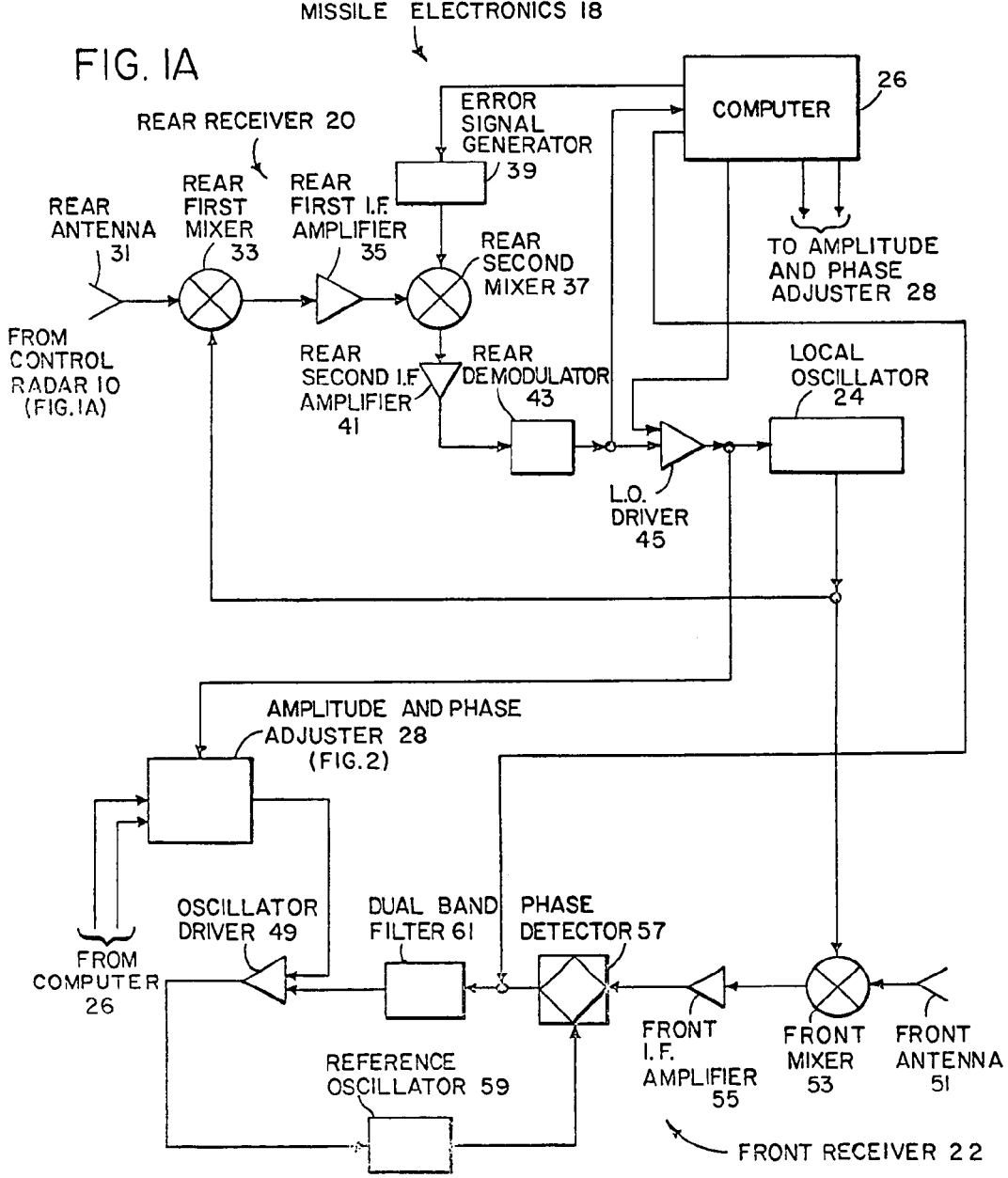

Referring now to FIG. 1, a control radar 10 (here an FM-CW radar) carried on a mother aircraft 12 is shown to be illuminating a guided missile 14 and a target 16 (here an aircraft). Taking the phase of the frequency modulation being transmitted by the control radar 10 at any instant in time as a reference, it will be observed that the phase shift of the transmitted radar signal received at the guided missile 14 is a function of the propagation delay of such signal in traveling from the control radar 10 to the guided missile 14; similarly, the phase shift of the echo signal received at the guided missile 14 is a function of the sum of the propagation delay of the transmitted radar signal in traveling from the control radar 10 to the target 16 and the propagation delay of the echo signal in traveling from the target 16 to the guided missile 14. It will also be observed that the amplitude of the transmitted radar signal received at the guided missile 14 is greater than the amplitude of the echo signal until such missile enters the terminal phase of its flight. With the foregoing in mind, it will be obvious that the missile electronics 18 must, if the frequency modulation on the transmitted radar signal is to be used, be adapted to shift phase and change amplitude to form a replica of the frequency modulation on the echo signal.

Referring now to FIG. 1A, it should first be noted that the representation of the missile electronics 18 in the FIGURE has been limited to a showing of only the elements which are required for an understanding of this invention. Thus, the missile electronics 18 shown in FIG. 1A consist of a rear receiver 20, a front receiver 22, a local oscillator 24 (common to the front and rear receivers 22, 20), a computer 26 and an arrangement designated "amplitude and phase adjuster 28".

The rear receiver comprises a rear antenna 31 for receiving the transmitted radar signal from the control radar 10 (FIG. 1). Such receiver signal is downconverted by heterodyning in a rear first mixer 33 with a first local oscillator signal from the local oscillator 24. The downconverted signal, i.e. a signal at a first intermediate frequency, is passed, through a rear first I.F. amplifier 35, to a rear second mixer 37. A signal having a frequency representative of the tuning error of the front receiver 22 is produced by an error signal generator 39. Reference is here made to the referenced application for the constructional details of this generator. The again downconverted signal (now at a second intermediate frequency) is passed, via a rear second I.F. amplifier 41, to a rear demodulator 43. Again, the constructional details of the rear demodulator 43 are shown in the referenced application. Suffice it to say here that the output of the rear demodulator 43 is (with the front receiver 22 inoperative) a direct current signal having an amplitude and sense indicative of the tuning error of the local oscillator 24 plus an alternating component determined by the frequency modulation on the transmitted radar signal (as such signal is received by the rear antenna 31). The output of the rear demodulator 43 is applied as indicated to an L.O. driver 45 and to the computer 26. A portion of the signal out of the rear demodulator 43 is passed to the computer 26. As described in detail in the referenced application, computer 26 is responsive to the output of the rear demodulator 43 to produce, inter alia, programmed inputs to the L.O. driver 45 as required. A portion of the output of the L.O. driver 45 is passed to the local oscillator 24 (which, as described in detail in the referenced application comprises a voltage-controlled oscillator in circuit with an electronically tuned filter as the frequency determining element for such oscillator) to determine the first local oscillator frequency. It will be now appreciated that if, as is the case here, the bandwidth of the various elements just described is sufficiently wide to accommodate the frequency modulation on the output of the rear demodulator 43, ultimately the frequency of the local oscillator 24 will be changed to null the alternating component in the output of the rear demodulator 43. In other words, the output of the L.O. driver 45 will have a component corresponding to the frequency modulation on the transmitted radar signal as received by the rear receiver 20. Further, especially at the beginning of the flight of the guided missile 14 (FIG. 1), the signal-to-noise ratio is very high because of the proximity of the rear receiver 20 to the control radar 10 (FIG. 1).

The portion of the output of the L.O. driver 45 which is passed to an amplitude and phase adjuster 28 (described in detail in connection with FIG. 2) is converted therein to a replica of the phase modulation on the echo signal as received by the guided missile 14 (FIG. 1) and applied, when required, to an oscillator driver 49 in the front receiver 22.

The front receiver, as shown, consists of a front antenna 51, a front mixer 53 and a front I.F. amplifier 55 to produce one input signal to a phase detector 57. The second input to the latter then is derived from a reference oscillator 59 (here a voltage-controlled oscillator). The particular frequency of the reference oscillator 59 is determined by the output of the oscillator driver 49 which, in turn, is controlled, as shown, by the amplitude and phase adjuster 28, a dual-band filter 61 and control signals from the computer 26.

The characteristics of the dual-band filter 61 (referred to the frequency modulation on the echo signal) here are such that: (a) while the echo signal is being acquired, the bandwidth of the dual-band filter 61 is greater than the bandwidth required to accommodate the frequency modulation on the echo signal; and, (b) while the echo signal is being tracked, the bandwidth of the dual-band filter 61 is less than the bandwidth required to accommodate the frequency modulation on the echo signal. In the former situation, the alternating portion of the output of the phase detector 57 is passed through the dual-band filter 61 to the oscillator driver 49 without any substantial phase shift or attenuation. In the latter situation, however, significant phase shift and attenuation is suffered by the alternating portion of the output of the phase detector 57 in passing through the dual-band filter 61. If the effect of noise were to be neglected, the amplitude and phase adjuster 28 would be required only when a target is being tracked. As noted hereinbefore, however, the effect of noise cannot be neglected when the signal-to-noise ratio at the input of the dual-band filter 61 is small, i.e. near unity. In practice, then, the amplitude and phase adjuster 28 is required except when the guided missile 14 (FIG. 1) is in the terminal part of its flight.

Figure 2:
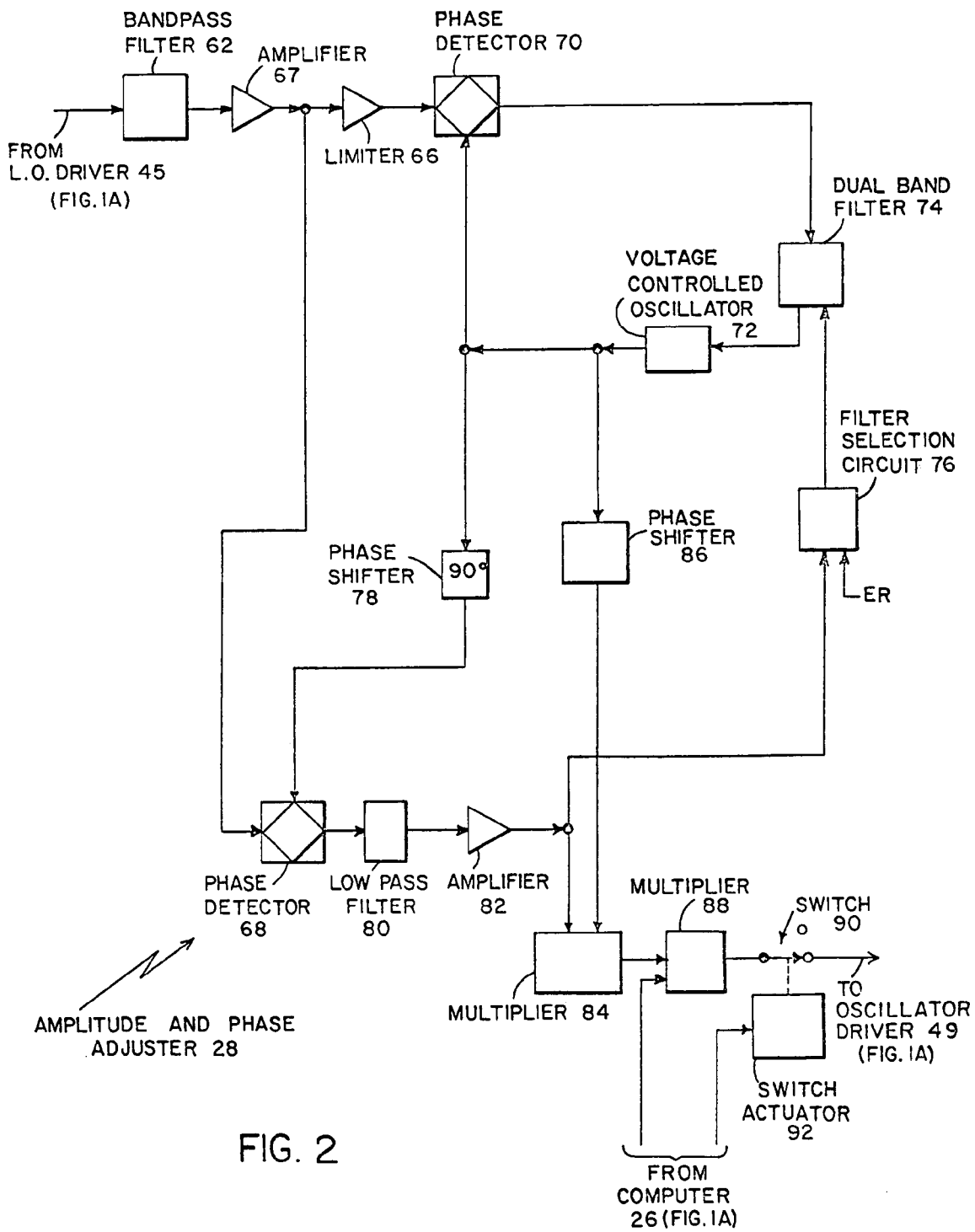
FIG. 2 is a block diagram showing how the frequency modulation on the radar signal transmitted directly from the control radar (FIG. 1) may be demodulated and adjusting the phase and amplitude of the demodulated signal may be changed to produce a replica of the frequency modulation on the echo signal from the target.

Referring now to FIG. 2, it may be seen that the portion of the output of the L.O. driver 45 (FIG. 1A) which is applied to the amplitude and phase adjuster 28 is first passed through a bandpass filter 62. That element has a passband to accept the frequency modulation on the transmitted radar signal from the control radar 10 (FIG. 1), regardless of any nominal shift in the rate at which the transmitted radar signal is modulated during operation. As a result, then, the bandpass filter 62 is operative to increase the signal-to-noise ratio of the signal to be processed. The output of the bandpass filter 62 is connected, after passing through an amplifier 67, to a limiter 66 and also to a phase detector 68. The output of the limiter 66 (which output is indicative of the instantaneous phase of the frequency modulation on the transmitted, radar signal) is applied to a phase detector 70. The second input to the phase detector 70 is derived from a voltage-controlled oscillator 72. The frequency of the latter is adjusted, through a dual-band filter 74, to null the output of the phase detector 70. In operation the passband of the dual-band filter 74 is controlled by a filter selection circuit 76 (which may be a differential amplifier having a reference voltage, $E_R$, and a signal indicative of the amplitude of the transmitted radar signal). The dual-band filter 74 may be of the type shown in the referenced application with the passbands typically 1 Hz and 10 Hz.

The output of the voltage-controlled oscillator 72 is also passed, through a 90° phase shifter 78, to the phase detector 68. The output of the latter then (which output is indicative of the deviation of the frequency modulation on the transmitted radar signal) is passed through a low pass filter 80 and an amplifier 82 to a multiplier 84. The second input to the latter is taken from the voltage-controlled oscillator 72 through a phase shifter 86. The output of the multiplier 84 then is a signal of the same frequency and phase as the residual frequency modulation whose amplitude varies with the deviation of the frequency modulation on the transmitted radar signal.

A multiplier 88 is responsive to the output of the multiplier 84 and a signal indicative of the range between the guided missile 14 and the target 16 (FIG. 1). Such range indicative signal is formed by the computer 26 (FIG. 1A) by conventional processing of the outputs of inertial instruments (not shown). The output of the multiplier 88 is connected, through a switch 90 (actuated as shown by a switch actuator 92 when required), to the oscillator driver 49 (FIG. 1A).

Having described a preferred embodiment of this invention, it will now be apparent to one of skill in the art that changes may be made without departing from the concepts of this invention. It is felt, therefore, that this invention should not be restricted to its disclosed embodiment, but rather should be limited only by the spirit and scope of the appended claims.

What is claimed is:

1. In a semiactive missile guidance system wherein a frequency modulated continuous wave signal illuminates a guided missile to provide a reference signal at such missile and also illuminates a target to provide an echo signal directed to such missile, the reference signal and the echo signal being processed in the guided missile to derive guidance signals for such missile, an arrangement for compensating for the frequency modulation on the echo signal, such arrangement comprising:
   (a) first means for detecting the frequency modulation on the reference signal received at the guided missile to derive a first and a second detected signal representative respectively of the phase and deviation of the frequency modulation on the reference signal;
   (b) second means for processing the first and the second detected signals to provide a compensation signal which is a replica of the frequency modulation on the echo signal;
   (c) third means for detecting the frequency modulation on the echo signal received at the guided missile to provide a guidance signal; and
   (d) fourth means for applying the compensation signal to the third means to null the frequency modulation on the guidance signal.

2. The arrangement as in claim 1 wherein the first means includes:
   (a) limiting means, responsive to the reference signal to be detected, for normalizing such signal;
   (b) phase locking means, responsive to the normalized signal, for producing the first detected signal;
   (c) phase detecting means, responsive to the reference signal to be detected, for producing the second detected signal.

3. The arrangement as in claim 2 wherein the bandwidth of the phase locking means is less than the bandwidth of the frequency modulation on the normalized signal.

4. The arrangement as in claim 3 wherein the second means includes:
   (a) first multiplier means for multiplying the first and the second detected signals to produce a resultant signal; and
   (b) second multiplier means for multiplying the resultant signal with a signal indicative of the phase shift of the frequency modulation on the echo signal received at the guided missile to produce the replica of such frequency modulation.

* * * * *